Feb. 24, 1931.  T. P. CHASE  1,794,348
PRESSED METAL BRAKE SHOE
Filed March 14, 1928
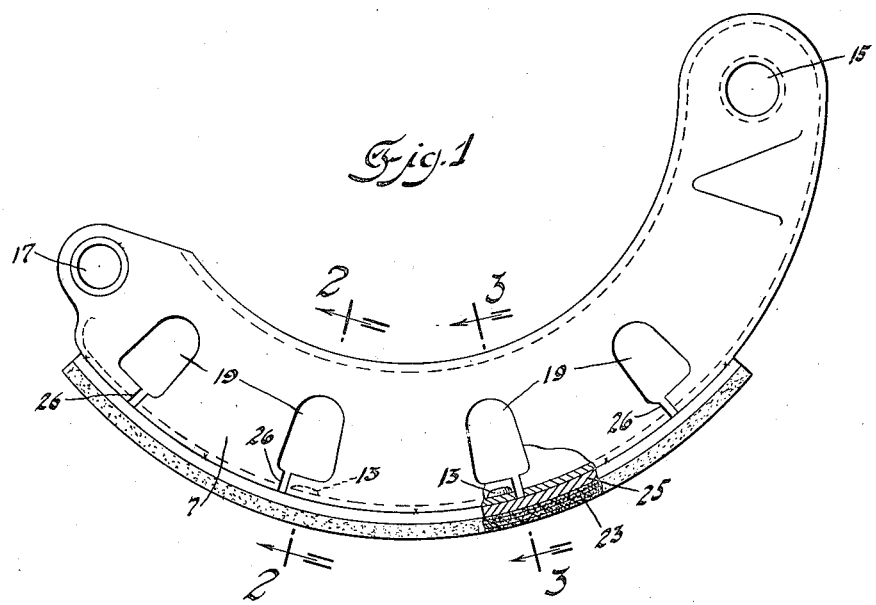
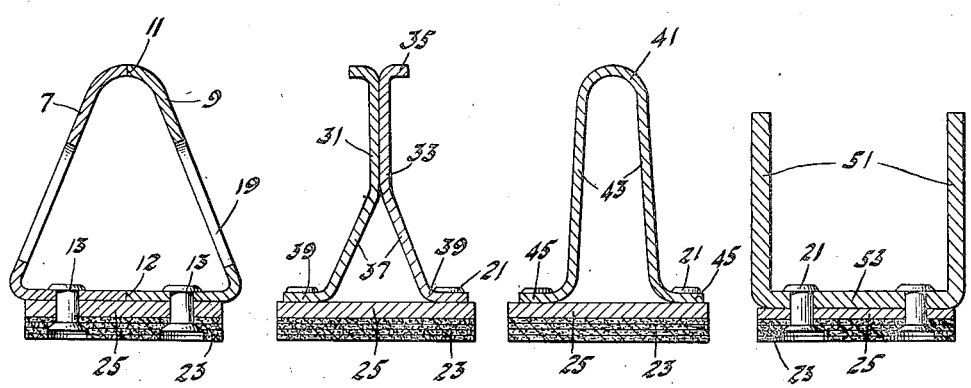
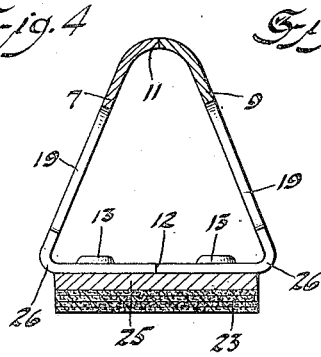
Inventor
Theron P. Chase
By Blackmore, Spencer & Fitch
Attorneys Patented Feb. 24, 1931

1,794,348

UNITED STATES PATENT OFFICE

THERON P. CHASE, OF DETROIT, MICHIGAN, ASSIGNOR TO GENERAL MOTORS RESEARCH CORPORATION, OF DETROIT, MICHIGAN, A CORPORATION OF DELAWARE

PRESSED-METAL BRAKE SHOE

Application filed March 14, 1928. Serial No. 261,599.

This invention relates to brake shoes and has been designed more particularly for use in connection with brakes as used in motor vehicles.

The object of the invention is to provide such a construction of brake shoe as will insure conformity to the surface of the drum with which the shoe is to frictionally engage. As another object, the invention aims to construct a shoe in which the distortion in shape due to the influence of heat is avoided. Other objects and advantages will be understood from a reading of the following description and an examination of the accompanying drawing.

The invention may be embodied in several forms, a few of which are shown in the drawing.

Figure 1 is a side elevation of a brake shoe, partly in section, embodying my present improvement.

Figure 2 is a section on line 2—2 of Figure 1.

Figure 3 is a section on line 3—3 of Figure 1.

Figures 4, 5 and 6 are transverse sections through three different modified forms of brake shoe. Each discloses the common novel feature to prevent thermostatic deformation.

First referring to Figures 1 to 3 inclusive, the brake shoe is constructed as a closed box-like member. It is formed of two arc-shaped channel members 7 and 9. These parts are placed with their open channels face to face and the channel members are then welded together as at 11 and 12. One end of the arc-shaped shoe thus formed is closed and apertures through the walls are formed as at 15 to co-operate with a suitable anchor pin when the brake is assembled in relation to the drum. The other end of the shoe is preferably apertured as at 17 to receive a roller or other cam engaging member. The details relating to the anchor and the construction provided for cam engagement do not constitute a part of this invention and need not be more fully described or illustrated. Inasmuch as the flanges of the shoe members 7 and 9 form the lining carrying portion of the shoe, the rivets must enter the enclosure. For the purpose of giving access to rivets 13 by which the lining 23 is secured, openings 19 are formed in the side walls of the shoe. These openings 19 are formed with extension openings 26 of reduced size, the openings 26 extending to the outer edge of the shoe periphery. The purpose of these openings 26 is to give flexibility to the shoe, whereby it may modify its arc shape to conform to the shape of the drum. This is of importance as brake drums are frequently out of round, and in use temperature changes, particularly changes due to heat from the friction of brake application, modify the drum dimensions, and the shoe should be capable of modifying its shape to conform to these changes in the shape of the drum.

A difficulty in case of rigid shoes has been encountered which this invention aims to overcome. The heat of the shoe on the arc portion adjacent the drum where the friction occurs is much greater than on the inner arc of the shoe beam. This unequal heat is attended with greater expansion of the part of the shoe adjacent the drum than along the inner periphery of the shoe. As a consequence, the shoe tends to curl or assume a shape having a smaller radius with the result that the toe portion, that portion adjacent the cam, may cease to contact with the drum when the brake is applied. Undue wear then occurs at the heel of the shoe. After the brake cools off and is again applied, the toe portion contacts more forcefully than intended owing to the worn condition of the lining at the heel. The brake then grips. These conditions are well understood and are only briefly alluded to to explain the importance of constructing a brake shoe to conform to the drum under all conditions of use. To this end advantage is taken of the low coefficient of expansion of invar steel relative to the high coefficient of expansion of ordinary steel. Along the outer arc of the shoe proper and between the shoe and lining there is placed a strip of invar steel which is represented by numeral 25. At a plurality of points, the points being marked by crosses on Figure 1, the invar steel strip is welded to the shoe proper. Instead of welding, other means such as riveting may be substituted if preferred. Since the more highly heated part of the shoe, the invar steel portion, expands at a lower rate owing to its relatively low coefficient of expansion, and since the relatively cooler part of the shoe, the ordinary steel portion, expands at a greater rate owing to its high coefficient of expansion, the inner and outer portions tend to maintain their normal relative position. Distortion and curling is prevented or largely diminished and a shoe is produced comparatively free from the known and serious defects of internal rigid shoe brakes, defects which have, it is believed, prevented the more general use of brakes of this kind. The flexibility of the shoe, owing to the use of the strip of invar steel and the notched regions of the steel beam permit the shoe to conform to any ordinary irregularities of the drum.

It will be understood that the advantages resulting from the use of a strip of low coefficient of expansion steel adjacent the drum is not restricted to the specific shape of pressed metal shoe shown in Figures 1 to 3. Several other forms are shown in section on the drawing, these forms merely illustrative of other shoe structures with which the inventive idea may be associated.

In Figure 4 is shown one such modified shoe formed of two shoe members 31 and 33. As illustrated, these shoe members may be welded or otherwise secured in contact for a portion of their radial extent. The inner ends of the shoe members 31 and 33 are provided with divergent flanges as at 35. Outwardly beyond the contacting portions of the shoe members, these members diverge as at 37, their outer ends being formed with flanges 39. The combined shallow channel members constitute a rigid shoe and the divergent outer ends afford a support for the invar steel strip 25 which is used as before. In this case, it is unnecessary to provide openings such as 19 in the form first described, the rivets 21 being accessible from the outside. It will be understood, however, that the side walls 37 and the flanges 39 are to be provided with openings to permit the flexing of the shoe as a whole. In this form, as in the other, the lining 23 is secured by the rivets 21 which rivets pass through the flanges 39 and the invar steel strip.

In Figure 5, the brake shoe is formed from a pressed steel sheet as shown. Its inner end is curved as at 41 from which divergent walls 43 terminate in flanges 45 engaging and welded to or riveted to the invar steel strip 25 as before. Rivets 21 pass through the flanges 45, the invar steel strip 25 and secure the lining in position. It will be understood that here, too, there is no occasion for the openings 19 but that the walls will be slotted to permit flexibility of the shoe.

Figure 6 illustrates still another form which the invention may take. In this form, the brake shoe is of U-shape having flanges 51 and a web 53. The flanges 51 and the web 53 will be provided with a plurality of slots to permit the expansion of the shoe. The invar steel strip will be secured by welding or otherwise to the web 53. The rivets 21 pass through the web 53, the invar steel strip 25 and secure the lining 23.

In each of these forms, as well as in numerous other modifications not described, it will be understood that the region of greater heat is associated with a sheet of metal having relatively low coefficient of expansion, and that the region of lesser heat employs a metal having a greater coefficient of expansion with the result that the tendency to distortion and to curling is largely avoided. In each case, the flexibility obtained by the cutting away of material from the side walls insures conformity with the drum surface when the brake is applied.

I claim:

1. In motion retarding mechanism, a shoe having opposed portions, one portion designed for frictionally engaging a related movable member, the movement of which is to be checked, the portion designed for frictional engagement including a part of relatively low coefficient of expansion and having a non-metallic lining secured thereto and the other portion constructed to have a relatively high coefficient of expansion.

2. In motion retarding mechanism, an arc-shaped shoe, the outer part of the shoe having a portion of low coefficient of expansion and the inner part of the shoe having a relatively high coefficient of expansion and a non-metallic lining carried by said outer part.

3. In motion retarding mechanism, an arc-shaped shoe comprising a steel shoe beam and an invar steel strip secured to the face thereof whereby the part of said shoe subject to frictional engagement and, consequently, greater heat is given a lower coefficient of expansion.

4. A brake shoe formed of pressed metal and provided with openings to give flexibility, a strip of metal having a low coefficient of expansion secured to the part of said shoe designed for frictionally engaging the co-operating member, the movement of which is to be checked.

5. A brake shoe formed of pressed metal and provided with openings to give flexibility, a strip of invar steel secured to the frictionally engaging surface of said shoe, and a suitable lining secured to said shoe outside said invar steel strip.

6. A brake shoe comprised of channel members having mating flanges constituting a lining carrying part, a plate member of low coefficient of expansion secured to said lining carrying part, openings in the channel members to give access to lining rivets, said openings continued to the edge of the shoe to give flexibility to the shoe.

7. A brake shoe of arc shape, means on the outer surface of said shoe and secured thereto to prevent thermostatic deformation.

8. The invention defined by claim 7, said means comprising a strip of metal having a lower coefficient of expansion than the body portion of said shoe.

9. The invention defined by claim 7, said means comprising a strip of invar steel welded to the body of said shoe.

10. The invention defined by claim 7, said shoe having openings to give flexibility and said last-named means consisting of a strip of invar steel to prevent curling of the shoe under the influence of unequal heat conditions of the inner and outer parts of the shoe.

In testimony whereof I affix my signature.

THERON P. CHASE.